(12) United States Patent
Kava et al.

(10) Patent No.: US 11,548,485 B2
(45) Date of Patent: Jan. 10, 2023

(54) ELECTRIFIED VEHICLE CONFIGURED TO ADDRESS EXCESS BRAKING REQUEST BY SELECTIVELY INCREASING DRAG

(71) Applicant: Ford Global Technologies, LLC, Dearborn, MI (US)

(72) Inventors: Christopher Michael Kava, Livonia, MI (US); Shevon Vannitamby, Farmington Hills, MI (US); Joshua Boerger, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 16/787,092

(22) Filed: Feb. 11, 2020

(65) Prior Publication Data

US 2021/0245720 A1    Aug. 12, 2021

(51) Int. Cl.
| | | |
|---|---|---|
| *B60T 1/16* | (2006.01) | |
| *B62D 37/02* | (2006.01) | |
| *B60T 1/10* | (2006.01) | |
| *F16D 61/00* | (2006.01) | |
| *B62D 35/00* | (2006.01) | |

(52) U.S. Cl.
CPC ............... *B60T 1/16* (2013.01); *B60T 1/10* (2013.01); *B62D 37/02* (2013.01); *F16D 61/00* (2013.01); *B60T 2201/03* (2013.01); *B60T 2270/604* (2013.01); *B62D 35/007* (2013.01)

(58) Field of Classification Search
CPC . B60T 1/10; B60T 1/16; B60T 13/586; B60T 2201/03; B60T 2270/604; B60T 2270/60; B62D 37/02; B62D 35/007; F16D 61/00
See application file for complete search history.

(56) References Cited

U.S. PATENT DOCUMENTS

| | | | | |
|---|---|---|---|---|
| 4,611,796 A | * | 9/1986 | Orr ...................... | B62D 35/001 |
| | | | | 296/180.2 |
| 2012/0067676 A1 | * | 3/2012 | Bramscher ................ | B60T 1/10 |
| | | | | 188/106 P |

(Continued)

FOREIGN PATENT DOCUMENTS

| | | | | |
|---|---|---|---|---|
| DE | 10222082 A1 | 11/2003 | | |
| DE | 102008043470 A1 | * | 5/2010 | ............. B62D 35/00 |

(Continued)

*Primary Examiner* — Thomas W Irvin
(74) *Attorney, Agent, or Firm* — David B. Kelley; Carlson, Gaskey & Olds, P.C.

(57) ABSTRACT

This disclosure relates to an electrified vehicle configured to address an excess braking request, such as a braking request in excess of what can be met by an energy recovery mechanism, by selectively increasing the drag of the electrified vehicle. A corresponding method is also disclosed. An example electrified vehicle includes an energy recovery mechanism, an actuator configured to adjust a position of a moveable component influencing a drag of the electrified vehicle, and a controller. The controller is configured to instruct the energy recovery mechanism to meet a braking request and, when the braking request cannot be met by the energy recovery mechanism, the controller is configured to instruct the actuator to adjust the position of the moveable component to increase the drag of the electrified vehicle.

18 Claims, 2 Drawing Sheets

(56) References Cited

U.S. PATENT DOCUMENTS

| | | | | |
|---|---|---|---|---|
| 2015/0232138 A1* | 8/2015 | Parry-Williams | .... | B62D 35/005 |
| | | | | 296/180.5 |
| 2016/0229467 A1* | 8/2016 | Miller | .................... | G01S 13/931 |
| 2019/0106163 A1* | 4/2019 | Fahland | ................. | B62D 37/02 |

FOREIGN PATENT DOCUMENTS

| | | | | | |
|---|---|---|---|---|---|
| DE | 102017200384 A1 | | 7/2018 | | |
| EP | 2030851 B1 | | 3/2009 | | |
| GB | 2592010 A | * | 8/2021 | ................ | B60T 1/16 |
| JP | 2016002877 A | * | 1/2016 | | |
| JP | 2019205272 A | * | 11/2019 | | |
| KR | 20030009604 A | | 2/2003 | | |
| KR | 20140106029 A | | 9/2014 | | |
| WO | WO-2012020549 A1 | * | 2/2012 | ................ | B60T 1/16 |

* cited by examiner

ELECTRIFIED VEHICLE CONFIGURED TO ADDRESS EXCESS BRAKING REQUEST BY SELECTIVELY INCREASING DRAG

TECHNICAL FIELD

This disclosure relates to an electrified vehicle configured to address an excess braking request, such as a braking request in excess of what can be met by an energy recovery mechanism, by selectively increasing the drag of the electrified vehicle. A corresponding method is also disclosed.

BACKGROUND

Generally, electrified vehicles are selectively driven using one or more battery-powered electric machines. Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), and battery electric vehicles (BEVs). Some electrified vehicles use energy recovery mechanisms, such as regenerative braking systems, to recover energy. The recovered energy is typically stored within a battery until the energy is used to power the electric machines.

SUMMARY

An electrified vehicle according to an exemplary aspect of the present disclosure includes, among other things, an energy recovery mechanism, an actuator configured to adjust a position of a moveable component influencing a drag of the electrified vehicle, and a controller. The controller is configured to instruct the energy recovery mechanism to meet a braking request and, when the braking request cannot be met by the energy recovery mechanism, the controller is configured to instruct the actuator to adjust the position of the moveable component to increase the drag of the electrified vehicle.

In a further non-limiting embodiment of the foregoing electrified vehicle, the vehicle includes friction brakes, and, after the position of the moveable component is adjusted, the controller is configured to activate the friction brakes to meet a remainder of the braking request that is not met by the energy recovery mechanism and the increased drag of the electrified vehicle attributable to movement of the moveable component.

In a further non-limiting embodiment of any of the foregoing electrified vehicles, the friction brakes include disc brakes.

In a further non-limiting embodiment of any of the foregoing electrified vehicles, the vehicle includes an engine, and the controller is configured to selectively activate one or both of engine braking and the friction brakes to meet the remainder of the braking request.

In a further non-limiting embodiment of any of the foregoing electrified vehicles, the moveable component includes an active grille shutter assembly having a plurality of louvres moveable by the actuator.

In a further non-limiting embodiment of any of the foregoing electrified vehicles, the moveable component is a flap of the electrified vehicle.

In a further non-limiting embodiment of any of the foregoing electrified vehicles, the moveable component is a hood vent of the electrified vehicle.

In a further non-limiting embodiment of any of the foregoing electrified vehicles, the moveable component is a window of the electrified vehicle.

In a further non-limiting embodiment of any of the foregoing electrified vehicles, the moveable component includes a suspension system configured to adjust a ride height of the electrified vehicle.

In a further non-limiting embodiment of any of the foregoing electrified vehicles, the moveable component includes a duct.

In a further non-limiting embodiment of any of the foregoing electrified vehicles, the moveable component is one of a plurality of moveable components influencing the drag of the vehicle, a position of each of the moveable components is adjustable by a respective actuator, and, when the braking request cannot be met by the energy recovery mechanism, the controller is configured to instruct each of the actuators to adjust the position of each of the moveable components to increase the drag of the electrified vehicle.

In a further non-limiting embodiment of any of the foregoing electrified vehicles, when the braking request cannot be met by the energy recovery mechanism and when an override condition is present, the controller is configured such that the controller does not instruct the actuator to adjust the position of the moveable component.

In a further non-limiting embodiment of any of the foregoing electrified vehicles, the controller is configured to determine that an override condition is present by monitoring one or more of a speed of the electrified vehicle, a status of the moveable component, a temperature of a motor of the electrified vehicle, a temperature of an engine of the electrified vehicle, and a temperature of a coolant of the electrified vehicle.

In a further non-limiting embodiment of any of the foregoing electrified vehicles, the energy recovery mechanism is configured to apply a negative torque to at least one wheel of the electrified vehicle.

In a further non-limiting embodiment of any of the foregoing electrified vehicles, the energy recovery mechanism is a regenerative braking system configured to selectively resist rotation of at least one wheel of the electrified vehicle.

In a further non-limiting embodiment of any of the foregoing electrified vehicles, the vehicle includes a battery pack, and the controller is configured to selectively direct power from the energy recovery mechanism to the battery pack.

In a further non-limiting embodiment of any of the foregoing electrified vehicles, the electrified vehicle is one of a hybrid electric vehicle, plug-in hybrid electric vehicle, and a battery electric vehicle.

A method according to an exemplary aspect of the present disclosure includes, among other things, applying a negative wheel torque from an energy recovery mechanism in response to a braking request, and adjusting a position of a moveable component to increase a drag of an electrified vehicle when the energy recovery mechanism cannot meet the braking request.

In a further non-limiting embodiment of the foregoing method, the method includes activating one or both of friction brakes and engine braking when the braking request is not met by the applying and adjusting steps.

In a further non-limiting embodiment of any of the foregoing methods, the moveable component is one of a plurality of moveable components, and the adjusting step includes adjusting the position of each of the moveable components.

DETAILED DESCRIPTION

This disclosure relates to an electrified vehicle configured to address an excess braking request, such as a braking request in excess of what can be met by an energy recovery mechanism, by selectively increasing the drag of the electrified vehicle. A corresponding method is also disclosed. An example electrified vehicle includes an energy recovery mechanism, an actuator configured to adjust a position of a moveable component influencing a drag of the electrified vehicle, and a controller. The controller is configured to instruct the energy recovery mechanism to meet a braking request and, when the braking request cannot be met by the energy recovery mechanism, the controller is configured to instruct the actuator to adjust the position of the moveable component to increase the drag of the electrified vehicle.

This disclosure has a number of other benefits which will be appreciated from the following description. Among them, this disclosure lessens the degradation of the vehicle's friction brakes and engine, while taking advantage of the existing vehicle hardware and without causing an undue increase in noise and/or vibrations. This disclosure may also improve fuel economy.

Figure 1:
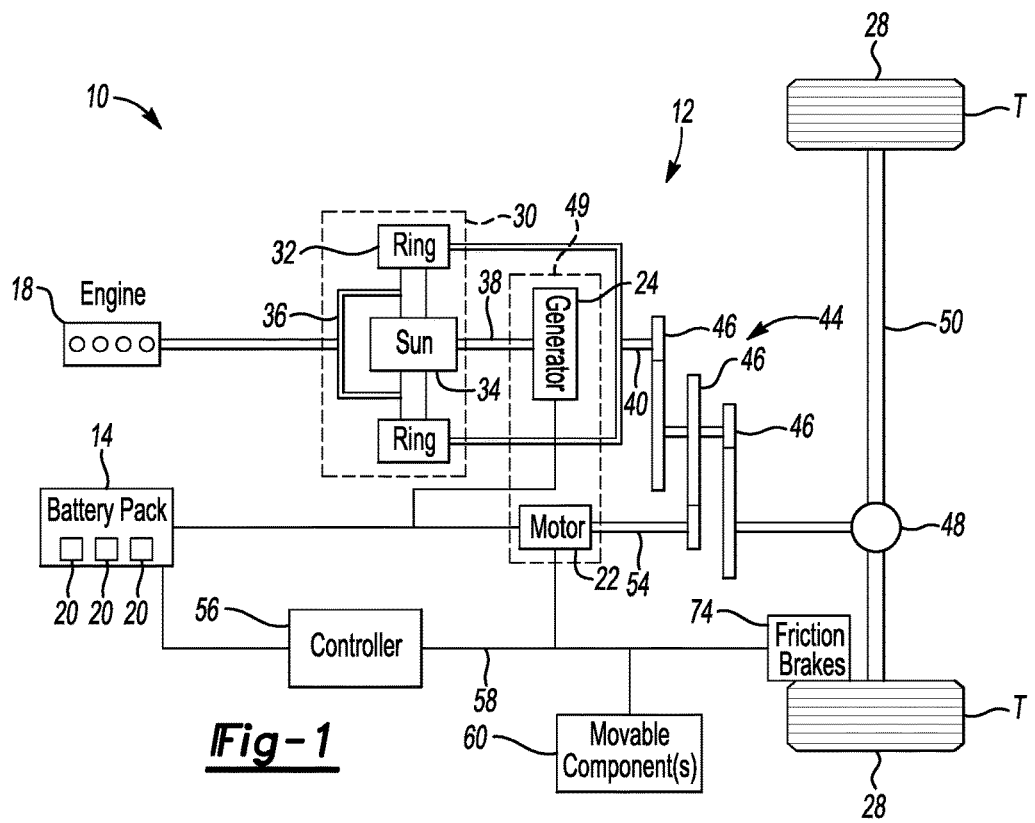
FIG. 1 schematically illustrates an example powertrain of an electrified vehicle.

FIG. 1 schematically illustrates an example powertrain 10 for an electrified vehicle 12 ("vehicle 12"), which in this example is a hybrid electric vehicle (HEV). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), and battery electric vehicles (BEVs). This disclosure also extends to various types of hybrid vehicles including full hybrids, parallel hybrids, series hybrids, mild hybrids, micro hybrids, and plug-in hybrids. Further, the vehicle 12 is depicted schematically in FIG. 1, but it should be understood that this disclosure is not limited to any particular type of vehicle, and extends to cars, trucks, sport utility vehicles (SUVs), vans, etc.

With continued reference to FIG. 1, a battery pack 14, sometimes referred to as a vehicle battery or simply a battery, and an internal combustion engine 18 ("engine 18") selectively operate with the powertrain 10. The battery pack 14 includes arrays 20 of rechargeable battery cells. In this disclosure, any reference to the battery pack 14 also includes, where appropriate, the arrays 20 of battery cells. The powertrain 10 includes a motor 22 and a generator 24, both of which are types of electric machines. The motor 22 and generator 24 may be separate or may have the form of a combined motor-generator.

Figure 2:
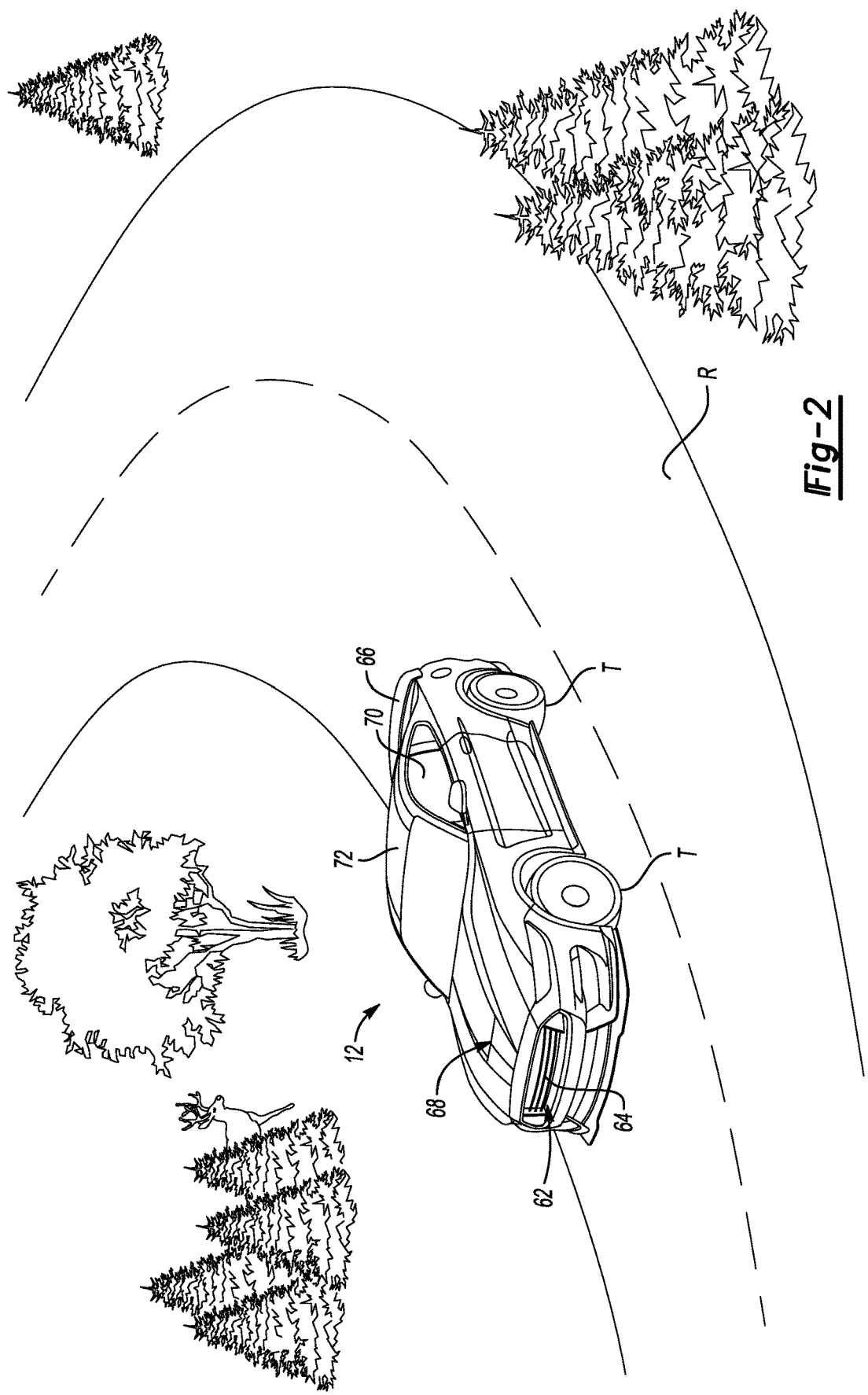
FIG. 2 illustrates an electrified vehicle traveling on a road surface and, in particular, descending a grade. The electrified vehicle includes a plurality of moveable components configured to selectively increase the drag of the electrified vehicle.

In the embodiment of FIG. 1, the powertrain 10 is a power-split transmission that employs a first drive system and a second drive system. The first and second drive systems generate torque to drive one or more sets of vehicle drive wheels 28, which include tires T configured to directly contact a road surface R (FIG. 2). While two vehicle drive wheels 28 are shown in FIG. 1, this disclosure is not limited to vehicles with two wheels, and extends to vehicles with two or more wheels, some or all of which may be drive wheels. The first drive system includes a combination of the engine 18 and the generator 24. The second drive system includes at least the motor 22, the generator 24, and the battery pack 14. The motor 22 and the generator 24 are portions of an electric drive system of the powertrain 10.

The engine 18 and the generator 24 may be connected through a power transfer unit 30, such as a planetary gear set. Other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18, for example, to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28. The motor 22 can be selectively employed to drive the vehicle drive wheels 28 by outputting torque to a shaft 54 that is also connected to the second power transfer unit 44.

Further, in this embodiment, the motor 22 and the generator 24 cooperate as part of an energy recovery mechanism 49, which in this example is a regenerative braking system, in which both the motor 22 and the generator 24 can be employed as motors to output torque. For example, the motor 22 and the generator 24 can each output electrical power to recharge cells of the battery pack 14.

The vehicle 12 additionally includes a controller 56 configured to monitor and/or control various aspects of the powertrain 10 and associated vehicle 12. For example, the controller 56 may communicate with the electric drive system, the power transfer units 30, 44, and/or other sensors and components to monitor various conditions of the vehicle 12, control the vehicle 12, or both. The controller 56 includes electronics, software, or both, to perform the necessary control functions for operating the vehicle 12. In one non-limiting embodiment, the controller 56 is a combination vehicle system controller and powertrain control module (VSC/PCM). Although it is shown as a single device, the controller 56 may include multiple controllers in the form of multiple hardware devices, or multiple software controllers within one or more hardware devices. A controller area network (CAN) 58, illustrated schematically, allows the controller 56 to communicate with the various components of the vehicle 12.

The controller 56 may include a neural network or may be in electronic communication with a cloud-based neural network. This disclosure is not limited to neural networks and includes other learning tools such as probabilistic models used to make inferences or predictions. In another embodiment, the controller 56 includes one or more lookup tables or algorithms in place of or in addition to a neural network.

The example vehicle 12 is a hybrid-electric vehicle having a powertrain, such as the powertrain 10. In another particular example, the vehicle 12 is an all-electric vehicle incorporating a regenerative braking system. In still other examples, the vehicle could be a vehicle incorporating an energy recovery mechanism other than a regenerative braking system.

As mentioned above, the motor 22 and the generator 24 cooperate as part of a regenerative braking system. The regenerative braking system, again, is a type of energy recovery mechanism 49. The regenerative braking system can be used to reduce, or maintain, the speed of the vehicle, while recovering energy and generating power for use by the vehicle 12.

Typically, the energy recovered by the regenerative braking system is stored in the battery pack 14. The regenerative braking system is used to apply a negative torque to the wheels 28 to maintain a speed, slow, or to limit acceleration of the vehicle 12 down a grade, for example. Depending on various conditions, such as desired vehicle speed, the steepness of the grade, etc., the vehicle 12 may vary a level of negative torque applied to the wheels by the energy recovery mechanism 49.

In one example of this disclosure, the level of negative torque applied to the wheels 28 by the energy recovery mechanism 49 is limited to an energy recovery threshold in order to prevent unwanted behaviors of the vehicle 12, such as vibrations, noise, etc. The negative wheel torque threshold is a level of negative wheel torque below which the energy recovery mechanism 49 will not cause the vehicle 12 to exhibit unwanted behaviors such as undue vibrations and/or noise. In this sense, the negative wheel torque threshold may be considered a capacity or upper limit. The negative wheel torque threshold corresponds directly or proportionally to a maximum regenerative braking threshold. In a particular example, the negative wheel torque threshold may originally be a predefined value stored in the controller 56 and set by the manufacturer of the vehicle 12 based on a designed mass of the vehicle 12 and other factors, including a predicted coefficient of friction between the tires T and the road surface R during use of the vehicle 12. As is known, a coefficient of friction is a unitless number that determines the amount of friction between materials in contact, in this case the tires T and the road surface R.

In this disclosure, the vehicle 12 includes one or more moveable components configured to influence (i.e., increase or decrease, depending on position) the drag of the vehicle 12. Drag, in this context, refers to a force acting opposite to the motion of the vehicle 12 with respect to a surrounding fluid, namely air. Example moveable components will be described in detail below and with reference to FIG. 2. The moveable components are represented schematically in FIG. 1 with reference numeral 60. In general, a position of each of the moveable components 60 is adjustable by a respective actuator or actuator assembly (not shown), and the controller 56 is configured to issue instructions to the various actuators to position the moveable components 60 to selectively change (i.e., increase or decrease) the drag of the vehicle 12. The actuators and/or actuator assemblies may be known types of actuators including, for example, electric actuators and may include corresponding mechanical linkages. Increasing the drag of the vehicle 12 can meet at least a portion of the braking request.

Example moveable components 60 are shown in FIG. 2 with reference to the vehicle 12. In the example of FIG. 2, the vehicle 12 includes an active grille shutter assembly 62, which includes a plurality of louvres 64 moveable by an actuator or actuator assembly (not shown) in response to instructions from the controller 56. When open, the louvres 64 permit air to flow into the grille of the vehicle 12, thereby cooling certain components of the powertrain 10, namely the engine 18 and motor 22, as examples. When the louvres 64 are open, the drag of the vehicle 12 is increased. When closed, the louvres 64 prevent air from flowing into the grille, thereby reducing the drag of the vehicle 12.

In FIG. 2, the vehicle 12 also includes additional moveable components, namely a flap 66, which in this example is a rear spoiler. The controller 56 is configured to instruct an actuator to adjust a position of the flap 66 to change the drag of the vehicle 12. The vehicle 12 also includes a hood vent 68 configured to selectively open and close in response to instructions from the controller 56. When the hood vent 68 is opened, air is allowed to enter via a hood of the vehicle 12, thereby increasing the drag of the vehicle 12. The vehicle 12 further includes a plurality of side windows 70 and a sunroof 72, which are configured to selectively open and close in response to instructions from the controller 56 to change the drag of the vehicle 12.

While various example moveable components have been mentioned herein, this disclosure extends to other moveable components. As examples, other example moveable components include a height adjustable suspension system configured to adjust a ride height of the vehicle 12 or ducts, such as brake cooling ducts, configured to selectively open and close to manage an airflow relative to the vehicle 12. While the vehicle 12 of FIG. 2 has multiple moveable components, this disclosure extends to vehicles with one or more moveable components.

With reference back to FIG. 1, the vehicle 12 further includes friction brakes 74 which can be selectively activated to slow the vehicle 12. The friction brakes 74 in this example are disc brakes that include calipers configured to squeeze a pair of pads against a rotor to create friction. The friction brakes 74 are illustrated schematically in FIG. 1. It should be understood that each wheel 28 of the vehicle 12 may include a respective friction brake. The controller 56 is configured to selectively issue instructions to apply or release the friction brakes 74. The controller 56 is also configured to slow the vehicle 12 using engine braking, which is sometimes referred to as compression braking. Using engine braking, the controller 56 issues instructions which cause the engine 18, for example, to slow the vehicle 12.

In an aspect of this disclosure, the controller 56 attempts to slow the vehicle 12 using only the energy recovery mechanism 49. In other words, the controller 56 attempts to meet all braking requests with the energy recovery mechanism 49. However, in conditions when the energy recovery mechanism 49 cannot fully meet a braking request, the controller 56 is configured to issue instructions to the actuator(s) associated with the moveable component(s) 60 to adjust the position of the moveable component(s) to increase the drag of the vehicle 12. If the increased drag does not slow the vehicle 12, the remainder of the braking request is met by the friction brakes 74 and/or engine braking. More detail of an example control strategy will now be described relative to FIG. 3.

Figure 3:
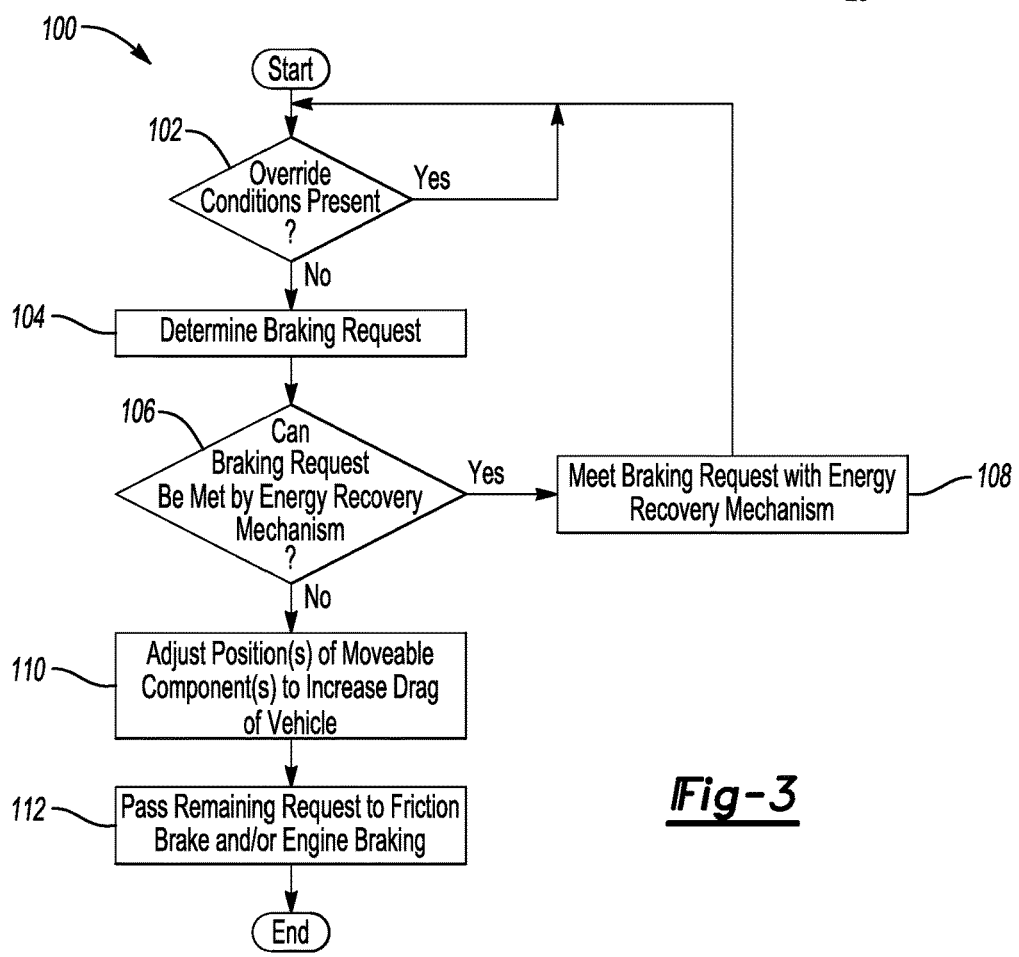
FIG. 3 is a flow chart representative of an example method of this disclosure.

FIG. 3 is a flow chart representative of an example method 100 of this disclosure. Various aspects of the vehicle 12, including an example control logic of the controller 56, will now be described with reference to FIG. 3 and with continued reference to FIGS. 1 and 2.

The method 100 begins, at 102, with the controller 56 determining whether any conditions are present which indicate that the control strategy of this disclosure should not be followed. Such conditions are referred to as override conditions herein.

One example override condition includes a speed of the vehicle 12 being below a threshold speed. The aerodynamic effect of the moveable components 60 is negligible at relatively low speeds, such as 20 miles per hour, for example. Another example override condition includes a status of the moveable components 60. For instance, if the active grille shutter assembly 62 is not functioning, the controller 56 may choose to not follow the control strategy of this disclosure. The controller 56 may also consider various temperatures and operating conditions, namely a temperature of the motor 22, temperature of the engine 18, and a temperature of any refrigerant or coolant of the vehicle 12. Depending on a condition of the vehicle 12 relative to those temperatures, the control strategy of this disclosure may be overridden. For instance, if the vehicle 12 is attempting to heat the motor 22, the controller 56 will not instruct the active grille shutter assembly 62 to open its louvres 64, as doing so would tend to cool the motor 22.

While some example override conditions have been described above, this disclosure extends to other example override conditions. When an override condition is present, the controller 56 is configured such that it does not instruct any of the actuators associated with the affected moveable components 60 to adjust their positions in an attempt to increase the drag of the vehicle 12. For instance, when the active grille shutter assembly 62 is not functioning properly or when attempting to heat the motor 22, the controller 56 proceed with the method 100 without using the active grille shutter assembly 62. Depending on the nature of the override condition(s), however, the controller 56 may meet braking requests using another control strategy entirely.

If override conditions are not present or the controller 56 otherwise determines that it can proceed (i.e., the answer to block 102 is "no"), then at 104 the controller 56 determines a braking request based on a force applied to a brake pedal and/or an amount of travel of the brake pedal. The controller 56 may also receive the braking request from a cruise control system of the vehicle 12 or from a self-driving system of the vehicle 12, as opposed to the brake pedal. The controller 56 may also be able to predict, based on current vehicle conditions, ambient conditions, and road conditions, the amount of braking required to meet the braking request.

At 106, the controller 56 determines whether the energy recovery mechanism 49 can meet the entire braking request. If so, at 108, the energy recovery mechanism is used to meet the entire braking request. This aspect of the disclosure prioritizes braking with the energy recovery mechanism, which in turn prioritizes recharging the battery pack 14 and reducing wear on the friction brakes 74 and the engine 18.

In some conditions, however, the energy recovery mechanism 49 cannot meet the entire braking request. For instance, in the example of FIG. 2, the vehicle 12 is traveling down a steep grade and the energy recovery mechanism 49 cannot meet the entire braking request because, even at the negative wheel torque threshold, the vehicle 12 would not be sufficiently slowed. In other words, in the example of FIG. 2, the energy recovery mechanism 49 cannot alone slow the vehicle 12 to its desired speed or maintain the vehicle 12 at a desired speed. Thus, the controller 56 attempts to meet the excess braking request, namely that which cannot be met by the energy recovery mechanism 49, by increasing the drag of the vehicle 12.

As such, at 110, the controller 56 instructs one or more actuators to adjust a position of a respective moveable component(s) 60 to increase the drag of the vehicle 12. In FIG. 2, the controller 56 may, in one embodiment, issue instructions causing the louvres 64 of the active grille shutter assembly 62 to open, to raise the flap 66, and to open the hood vent 68. The controller 56 may issue fewer or additional instructions in other examples and depending on the braking request. For instance, the controller 56 could also issue instructions to open one or both of the windows 70 and the sunroof 72. Movement of the windows 70 or sunroof 72 may be overridden if rain is present, in an example.

At 110, the controller 56 may be able to predict the increase in drag attributable to movement of the moveable component(s) 60 in current or future conditions. For instance, the controller 56 may consider weather, altitude, road grade, and other conditions, to predict an increase in drag attributable to the moveable component(s) 60. The controller 56 may use this prediction to determine which of the moveable component(s) 60 should be moved in response to a particular braking request. The controller 56 may also determine which of the moveable component(s) 60 is most appropriate to meet a particular braking request, and the degree to which the moveable component(s) should be moved.

If the increased drag of the vehicle 12 brought about by movement of the moveable component(s) 60 does not meet excess portion of the braking request (i.e., that which could not be met by the energy recovery mechanism 49), then at 112 the remaining portion of the braking request is met using the friction brakes 74 and/or by engine braking. Even when the friction brakes 74 and engine braking are used, the increased drag of the vehicle 12 reduces the reliance on the friction brakes 74 and engine braking.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   an energy recovery mechanism;
   an actuator configured to adjust a position of a moveable component influencing a drag of the electrified vehicle; and
   a controller configured to instruct the energy recovery mechanism to meet a braking request and, when the braking request cannot be met by the energy recovery mechanism, the controller is configured to instruct the actuator to adjust the position of the moveable component to increase the drag of the electrified vehicle, and, when the braking request cannot be met by the energy recovery mechanism and when an override condition is present, the controller is configured such that the controller does not instruct the actuator to adjust the position of the moveable component.

2. The electrified vehicle as recited in claim 1, further comprising:
   friction brakes; and
   wherein, after the position of the moveable component is adjusted, the controller is configured to activate the friction brakes to meet a remainder of the braking request that is not met by the energy recovery mechanism and the increased drag of the electrified vehicle attributable to movement of the moveable component.

3. The electrified vehicle as recited in claim 2, wherein the friction brakes include disc brakes.

4. The electrified vehicle as recited in claim 2, further comprising:
   an engine; and
   wherein the controller is configured to selectively activate one or both of engine braking and the friction brakes to meet the remainder of the braking request.

5. The electrified vehicle as recited in claim 1, wherein the moveable component includes an active grille shutter assembly having a plurality of louvres moveable by the actuator.

6. The electrified vehicle as recited in claim 1, wherein the moveable component is a flap of the electrified vehicle.

7. The electrified vehicle as recited in claim 1, wherein the moveable component is a hood vent of the electrified vehicle.

8. The electrified vehicle as recited in claim 1, wherein the moveable component includes a duct.

9. The electrified vehicle as recited in claim 1, wherein:
   the moveable component is one of a plurality of moveable components influencing the drag of the vehicle,
   a position of each of the moveable components is adjustable by a respective actuator, and
   when the braking request cannot be met by the energy recovery mechanism, the controller is configured to instruct each of the actuators to adjust the position of each of the moveable components to increase the drag of the electrified vehicle.

10. The electrified vehicle as recited in claim 1, wherein the controller is configured to determine that an override condition is present by monitoring one or more of a speed of the electrified vehicle, a status of the moveable component, a temperature of a motor of the electrified vehicle, a temperature of an engine of the electrified vehicle, and a temperature of a coolant of the electrified vehicle.

11. The electrified vehicle as recited in claim 1, wherein the energy recovery mechanism is configured to apply a negative torque to at least one wheel of the electrified vehicle.

12. The electrified vehicle as recited in claim 11, wherein the energy recovery mechanism is a regenerative braking system configured to selectively resist rotation of at least one wheel of the electrified vehicle.

13. The electrified vehicle as recited in claim 1, further comprising a battery pack, wherein the controller is configured to selectively direct power from the energy recovery mechanism to the battery pack.

14. The electrified vehicle as recited in claim 1, wherein the electrified vehicle is one of a hybrid electric vehicle, plug-in hybrid electric vehicle, and a battery electric vehicle.

15. The electrified vehicle as recited in claim 1, wherein the moveable component is a window of the electrified vehicle.

16. The electrified vehicle as recited in claim 1, wherein the moveable component includes a suspension system configured to adjust a ride height of the electrified vehicle.

17. An electrified vehicle, comprising:
   an energy recovery mechanism;
   an actuator configured to adjust a position of a window to influence a drag of the electrified vehicle; and
   a controller configured to instruct the energy recovery mechanism to meet a braking request and, when the braking request cannot be met by the energy recovery mechanism, the controller is configured to instruct the actuator to adjust the position of the window to increase the drag of the electrified vehicle.

18. An electrified vehicle, comprising:
   an energy recovery mechanism;
   a suspension system configured to adjust a ride height of the electrified vehicle to influence a drag of the electrified vehicle; and
   a controller configured to instruct the energy recovery mechanism to meet a braking request and, when the braking request cannot be met by the energy recovery mechanism, the controller is configured to instruct the suspension system to adjust the ride height of the vehicle to increase the drag of the electrified vehicle.

* * * * *